July 13, 1926.
J. KANTOR ET AL
DRAWBAR FOR HARROWS
Filed July 30, 1924
1,592,027
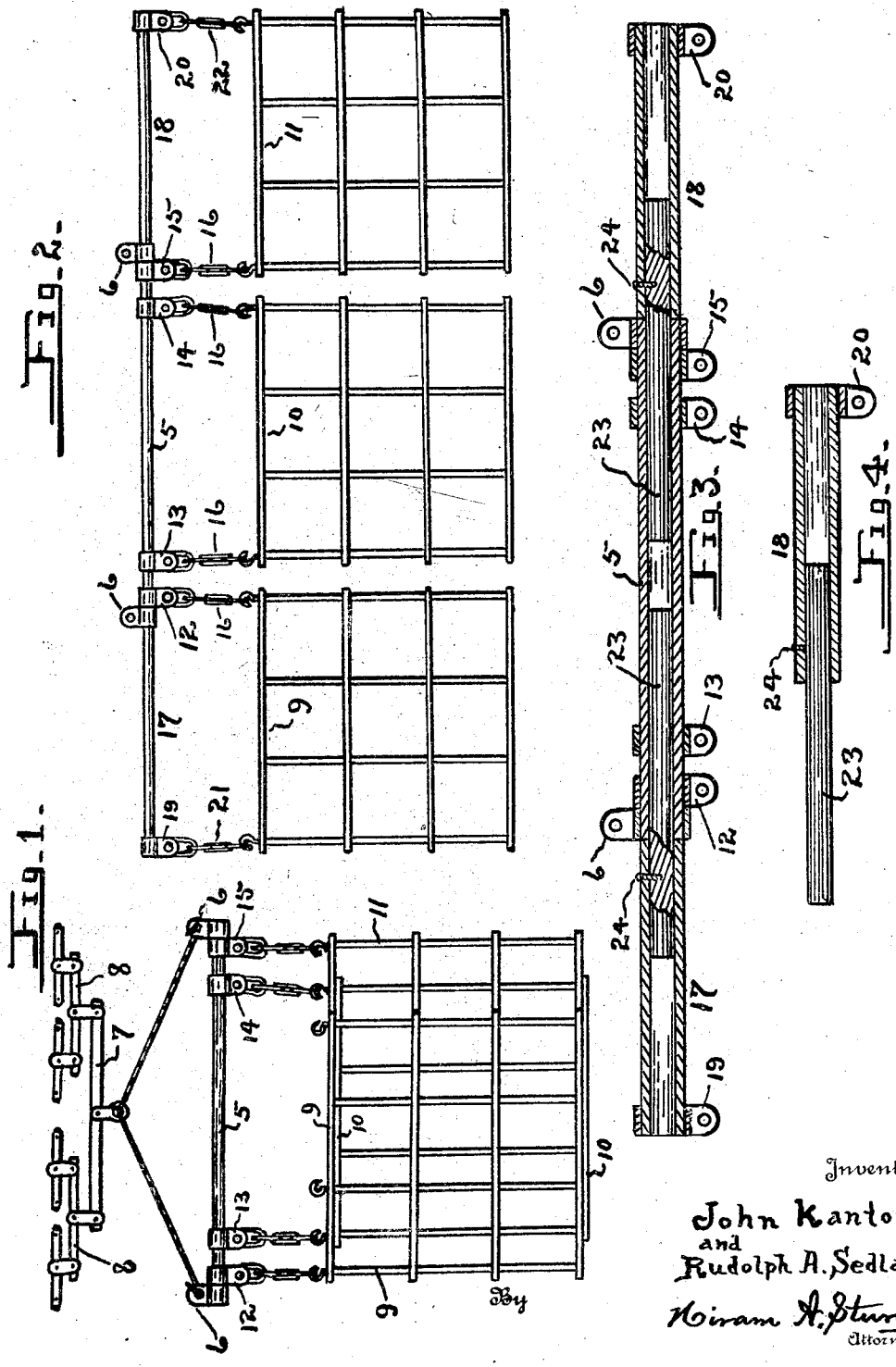
Inventor
John Kantor
and
Rudolph A. Sedlak,
By Hiram A. Sturges
Attorney Patented July 13, 1926.

1,592,027

UNITED STATES PATENT OFFICE.

JOHN KANTOR AND RUDOLPH A. SEDLAK, OF BEE, NEBRASKA.

DRAWBAR FOR HARROWS.

Application filed July 30, 1924. Serial No. 729,073.

This invention relates to a drag-bar for use in connection with harrows. In the work of farming it has been the custom to use a number of harrows and to use a single draw-bar of considerable length to which the harrows are attached, said harrows while thus attached being disposed side by side to be drawn across a field, the advantage, in part, being that, within a certain limit of time, a greater area of ground may be harrowed than ordinary, and that undulating or rough surfaces may be adequately harrowed.

However, in instances when it is necessary to drive upon a highway, or when moving through a gateway, or when it is desired to move the harrows between obstructions, it has been found that the drag-bars heretofore used operate to great disadvantage on account of their required length.

The invention has for its object to provide a drag-bar having removable end-extensions, each extension being adapted to co-operate with the drag-bar for supporting a harrow, and adapted to be readily removed to permit the harrows to be laid one upon another to occupy a limited area at the rear of the main drag-bar, so that the harrows may be moved upon a comparatively narrow highway or through a gateway or through a narrow passageway between obstructions.

With the foregoing objects in view and others to be mentioned hereinafter the invention presents a novel and useful construction, combination and arrangement of parts, as described herein and claimed, and as illustrated in the accompanying drawing, it being understood that changes in form, size, proportion and minor details may be made as found to be of advantage, said changes being determined by the scope of the invention as claimed.

In the drawing, Fig. 1 is a plan view showing the harrows disposed one upon another, the end-extensions being removed from the main drag-bar, and not shown. Fig. 2 is a plan view showing harrows connected with the drag-bar and its extensions. Fig. 3 is a view in longitudinal section of the drag-bar and its extensions. Fig. 4 shows one of the bar-extensions, its tubular part being in longitudinal section.

Referring now to the drawing for a more particular description, numeral 5 indicates a drag-bar provided at its ends with suitable holders or U-clips 6 which project forwardly, and to which may be attached a connecting-bar 7 for supporting the whiffletrees 8 so that the harrows, indicated at 9, 10 and 11 may be drawn, said drag-bar 5 being provided with suitable holders or U-clips 12, 13, 14 and 15 which extend rearwardly therefrom, chains 16 or other suitable holder elements being employed which connect the harrows with the rearwardly projecting clips mentioned.

For purposes of the invention we provide removable extensions 17 and 18 for the drag-bar 5, the extension 17 being provided at its outer end with a holder or U-clip 19 and the extension 18 being also provided at its outer end with a similar U-clip 20. Numeral 21 indicates a chain which may be used for connecting the U-clip 19 with the harrow 9 and which may be removed therefrom, and numeral 22 indicates a chain which may be used for connecting the U-clip 20 with the harrow 11 and which may be removed therefrom.

While chains have been specifically mentioned and are preferred, any other suitable means may be substituted if desired for removably connecting the outer ends of the extensions 17 and 18 with the respective harrows 9 and 11.

For further purposes of the invention the main drag-bar 5, and extensions 17 and 18 are of tubular form, each extension being provided with a projection or arm 23 which extends out from its inner end for a slidable mounting in the outer end of the tubular drag-bar 5. Numerals 24 indicate keepers or set-screws for securing the arms 23 in stationary relation with the tubular extensions 17 and 18.

Having thus described the several parts, operation will be readily understood. While in use for harrowing, the drag-bar 5 and its extensions 17 and 18, together with the harrows, are disposed as shown in Fig. 2 of the drawing, the chains 21 and 22, which are connected with the outer ends of the respective extensions 19 and 20, operating to support the harrows 9 and 11.

When it is desired to move from one field to another, or to move upon a narrow highway or to cross narrow bridges, and especially when it is desired to move through a gateway, the chains 21 and 22 are unfastened and the extensions 17 and 18 are removed from the tubular drag-bar 5, and the harrows 9 and 11 may then be swung to lie upon the harrow 10, so that the harrows will occupy a limited area to permit a movement through an ordinary gateway or other comparatively narrow passageway.

It will be seen that while the device is in use, the extensions 17 and 18, although slidingly disposed within, will not slide outwardly from the tubular drag-bar 5, but, normally, will remain in the positions shown in Fig. 2 of the drawings. Also it will be noted that while the projections 23 are disposed in the tubular draw-bar 5, an end of each extension operates as a stop-member to limit a movement in one direction of an extension. The diameters of the tubular bar 5 and the extensions 17 and 18 are practically uniform, and as is obvious, an end of an extension in engagement with an end of said tubular bar will tend to resist stresses directed to said extension by a harrow.

Among some of the advantages to be derived by use of the invention as described, it may be stated that the drag-bar including its extensions consists of few simple parts and may be manufactured at a limited expense; it may have any required length for supporting harrows having adequate widths, and the extensions may be conveniently removed from the main drag-bar 5 for the purposes mentioned, and may be readily replaced.

It will be understood that while moving through narrow gateways or the like, the chains 16 for the harrow 10 will be supported by the U-clips 13 and 14, said harrow 10 supporting the weight of the harrows 9 and 11, the harrow 9 being connected by a single chain 16 with the U-clip 12 of the bar 5, and the harrow 11 being connected by a single chain 16 with the U-clip 15 of said bar 5.

Since the U-clips 6 operate as holder members for the draft appendages 7 and 8, they should, of course, be mounted upon the ends of the bar 5, and since the extensions 17 and 18 should normally be disposed in alignment with the bar 5, they should be constructed of material adapted to sustain stresses directed thereto.

We claim as our invention,—

In a drag-bar for supporting a harrow and secondary harrows, a tubular bar connected with a single harrow and having holder-elements at its ends for connections with the secondary harrows, and a pair of secondary bars each provided with a stop-member, a projection and a holder-element, each secondary bar being adapted to be disposed with its stop-member in engagement with an end of the tubular bar with its projection slidingly disposed therein for a removable connection of its holder-element with a secondary harrow.

In testimony whereof, we have affixed our signatures.

JOHN KANTOR.
RUDOLPH A. SEDLAK.